Patented Nov. 23, 1948

2,454,266

UNITED STATES PATENT OFFICE 2,454,266

PYRAZOLONE AZO PIGMENT

Edward Armatys, New York, N. Y., assignor to Interchemical Corporation, New York, N. Y., a corporation of Ohio No Drawing. Application June 4, 1943, Serial No. 489,715

2 Claims. (Cl. 260—147)

This invention relates to a new yellow pigment of unusual light-fastness, and to a method of producing it and allied pigments. The new pigment is the product obtained by coupling tetrazotized dichlorobenzidine with phenyl methyl pyrazolone, and then coppering it with a considerable excess of copper over the theoretical amount. The pigment is characterized by unusual light-fastness for an organic yellow.

For the coloring of cloth with pigments (for example, by the methods disclosed in the Jenett U. S. Patent No. 2,222,582, and the Cassel U. S. Patent No. 2,248,696), it is necessary to use pigments which are resistant to many deteriorating influences, including soap, dry cleaning solvents, light, perspiration, etc. Good cheap pigments for producing khaki shades have always been difficult to obtain; the very expensive vat yellows have been used to a large extent. I have discovered that an excellent yellow for making khaki shades by pigment dyeing methods can be obtained by taking the relatively light-sensitive orange pigment obtained by coupling tetrazotized dichlorbenzidine with phenyl methyl pyrazolone, and coppering the pigment by treating an alkaline dispersion therewith with a cupric salt, substantially in excess over the theoretical quantity necessary to produce the copper derivative. The gelatinous cupric hydroxide formed combines with the pigment, apparently both chemically and physically; the resultant khaki yellow differs markedly in color from the original product, and is extremely light-fast. The shade can be varied somewhat by varying the excess of copper.

The method of coppering can be used for making copper derivatives of other dyestuffs; as compared with conventional coppering methods, it is a relatively simple operation, and appears to produce a product of enhanced fastness to light. Thus, the coupling of tetrazotized dianisidine and the anilide of beta oxy naphthoic acid, and similar couplings may be coppered by this method, with an improvement in the resultant light-fastness over conventional couplings.

As a typical example of my invention, dichlorbenzidine is tetrazotized in conventional fashion, and the product is coupled with an alkaline solution of phenyl methyl pyrazolone. The following proportions are typical:

29 pounds dichlorbenzidine hydrochloride (35% solids), 800 pounds water and ice, 9 pounds 35% HCl, 5 pounds NaNO₂ are used in tetrazotizing, keeping the temperature below 10° C. This is solution A.

11 pounds phenyl methyl pyrazolone, dissolved in 500 pounds of water, and 47 pounds of 50% NaOH are mixed with 7 pounds oleic acid to produce solution B.

61 pounds of CuSO₄ are dissolved in 500 pounds of water. The solution is cooled, and added to solution A; the mixture is then poured into solution B, while stirring. The slightly alkaline mix is neutralized with acetic acid; the curdy precipitate may be filtered, or flushed into oil, or any other water-immiscible vehicle.

The golden brownish pigment makes an excellent base for khakis.

Another example of the coppering method, with the blue obtained by coupling tetrazotized dianisidine with the anilide of beta oxy naphthoic acid, is as follows:

| | Grams |
|---|---|
| Stearic acid | 0.6 |
| Blue coupling of tetrazotized dianisidine and two mols of beta oxy naphthoic acid | 3.4 |
| Water | 40.9 |
| 50% NaOH | 7.2 |
| CuSO₄ | 10.8 |
| Water | 26.8 |

The azo pigment is added to the water containing caustic and stearic acid. The mix is heated to 80° C., and is stirred until a smooth paste results. Then the solution of copper sulfate is added, while stirring the whole at high speed with an Eppenbach stirrer. When the last of the copper solution has been added, the whole should be slightly alkaline. Then the solution is neutralized with acetic acid and filtered. For my purpose I add to the formula shown above 10.3 grams of pine oil and flush the pulp into the pine oil.

The pigment coupled by this method is substantially more light-fast than a similar pigment coppered with the conventional theoretical quantity of copper by conventional coppering methods.

Similar results are obtained if the copper sulfate is added, as in Example 1.

The method can be applied generally to couplings of diazotized and tetrazotized amines with the pyrazolones, and with beta oxy naphthoic acid and its derivatives, particularly the anilides and substituted anilides.

In order to get improved results with my method, it is necessary to use enough copper salt to form at least 1 gram of cupric hydroxide to each gram of pigment dyestuff (i. e. the copper content, calculated as cupric hydroxide, is at least 50% of the pigment weight), and conduct the coppering in an alkaline bath.

I claim:
1. A new, golden brown pigment of excellent light-fastness, obtained by coupling 10 parts by weight of tetrazotized dichlor benzidine with 11 parts by weight of phenyl-methyl-pyrazolone in a weak caustic soda solution containing a dispersing agent and 37 parts by weight cupric hydroxide, neutralizing and separating the precipitate.
2. A new, golden brown pigment of excellent light-fastness, obtained by coupling tetrazotized dichlor benzidine with phenyl-methyl-pyrazolone in a weak caustic soda solution containing a dispersing agent and an amount of cupric hydroxide exceeding in weight the subsequently formed coupling product, neutralizing and separating the precipitate.

EDWARD ARMATYS.

REFERENCES CITED

The following references are of record in the file of this patent:

UNITED STATES PATENTS

| Number | Name | Date |
|---|---|---|
| 1,001,286 | Laska | Aug. 22, 1911 |
| 1,042,356 | Laska et al. | Oct. 22, 1912 |
| 1,776,802 | Baddiley et al. | Sept. 30, 1930 |
| 2,227,504 | Krzikalla et al. | Jan. 7, 1941 |
| 2,294,426 | Scully | Sept. 1, 1942 |
| 2,335,535 | Reynolds | Nov. 30, 1943 |

FOREIGN PATENTS

| Number | Country | Date |
|---|---|---|
| 780,293 | France | Jan. 29, 1935 |

OTHER REFERENCES

Mellor's Modern Inorganic Chemistry, by C. D. Parkes and J. R. Mellor (1939), pub. Longmans Green & Company, New York city.